July 17, 1934.  E. G. C. LOFGREN  1,966,897
SLOW RUNNING ELECTRIC MOTOR
Filed Nov. 9, 1931  2 Sheets-Sheet 1
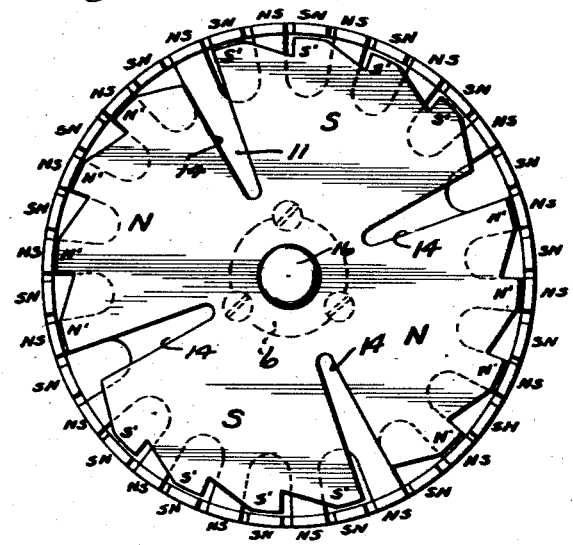
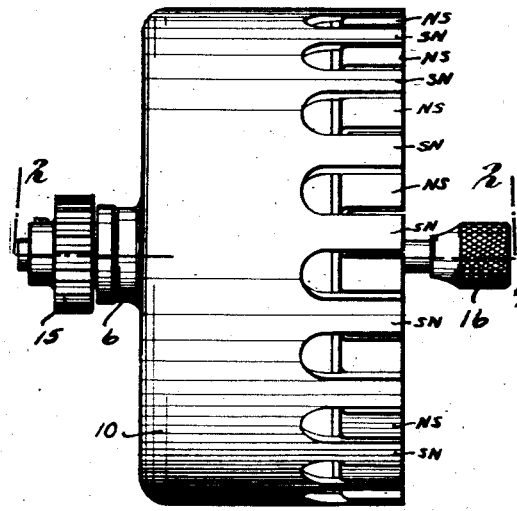
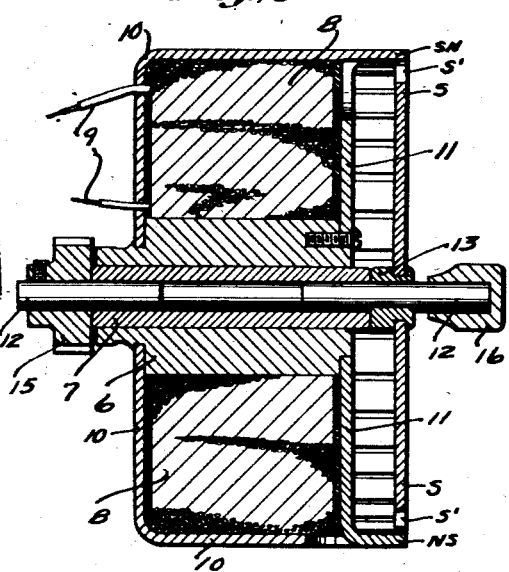
Inventor
Einar G. C. Lofgren
By his Attorneys July 17, 1934.         E. G. C. LOFGREN         1,966,897
            SLOW RUNNING ELECTRIC MOTOR
            Filed Nov. 9, 1931      2 Sheets-Sheet 2

Inventor
Einar G. C. Lofgren
By his Attorneys
Michaux Kilgore

Patented July 17, 1934

1,966,897

UNITED STATES PATENT OFFICE 1,966,897

SLOW-RUNNING ELECTRIC MOTOR

Einar G. C. Lofgren, Minneapolis, Minn., assignor to A. William Haydon, Hinsdale, Ill.

Application November 9, 1931, Serial No. 573,728

7 Claims. (Cl. 172—275)

Broadly considered, this invention relates to dynamo electric machines but is particularly directed to the provision of an extremely simple, highly efficient slow speed electric motor. Generally stated, the invention consists of the novel devices, combinations of devices and arrangement of parts hereinafter described and defined in the claims.

This improved electric motor, of course, comprises a stator and a rotor. One thereof, preferably the stator, has alternately interposed pole terminals of opposite polarity, and the other, preferably the rotor, has segmental or circumferentially spaced pole pieces provided with pole terminals of constant or unchanging polarity. The pole terminals of a given segment or group have the same polarity, and this is true in respect to the polarity of the pole terminals of each and all of the groups or segments. However, the pole terminals of some of the groups or segments have polarity that differs from the polarity of the pole terminals of certain other groups. The pole terminals of the stator or field are energized from an alternating current and hence their polarity will change in phase with the alternating current, but adjacent pole terminals will be given opposite polarity. The rotor or rotating armature, as above indicated, has permanently polarized segmental pole pieces and pole terminals. This is provided by a permanent magnet and affords extremely simple construction, especially desirable for small motors, such as required for operating clocks, phonographs and the like.

A commercial form of a small electric motor designed in accordance with this invention, is illustrated in the accompanying drawings, wherein like characters indicate like parts throughout the several views.

Referring to the drawings:

Fig. 1 is a plan view of the motor;

Fig. 2 is an axial section taken on the line 2—2 of Fig. 1;

Fig. 3 is a front or face elevation of the motor;

Figure 4:
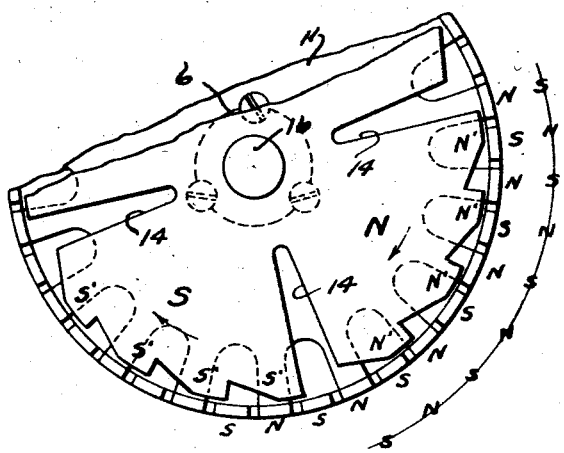
Fig. 4 is a fragmentary view in front elevation showing the rotor of the motor shifted slightly in respect to the position shown in Fig. 3.

Referring first to the structure illustrated in Figs. 1 to 4, inclusive, the numeral 6 indicates a sleeve-like soft iron core shown as provided with a bushing 7 preferably brass or bronze. Wound around the core 6 is a magnet coil 8 that is connected by lead wires 9 to a source of alternating current, preferably a single phase alternating current generator.

Connected to one end of the core 6 is an iron pole plate 10 and connected to the other end of said core is an iron pole plate 11. The pole plate 10 is made cup-shaped so that it encloses the core 8 and affords a housing or casing therefor. At its edge the plate 10 is formed with circumferentially spaced pole terminals N. S. that project beyond the plane of plate 11. The plate 11 is notched and formed with laterally and outwardly projecting pole terminals S. N. that are alternately interposed between the pole pieces N. S.

Extended through and rotatably mounted in the bushing 7 is a small rotor shaft 12. The armature is preferably in the form of a disc which, as shown, is rigidly secured to the rotor shaft 12 by a hub 13, preferably of brass, and which, by long radial notches 14 is cut or formed into a plurality of segments or circumferentially spaced pole pieces N. S. In the illustration here given there are two pole pieces N. and two poles pieces S. This rotor, as above indicated, is a permanent magnet; and it should be here stated that it is energized so that the pole pieces marked N are north poles, and the pole pieces marked S are south poles. As a highly important feature, the pole pieces N are peripherially notched so as to form on each pole piece or segment a group or plurality of pole terminals. The pole terminals of the sergments N are marked N', and the pole terminals of the pole pieces S are marked S'. Obviously, with this arrangement, all of the several pole terminals of the pole pieces N are north poles, and all of the several pole terminals of the pole pieces S are south poles. By this arrangement, both poles of the permanent magnets are caused to exert magnetic force in co-operation with the pole terminals of the stator or field.

As a means for transmitting motion from the rotor, shaft 12 is shown as provided at one end with a pinion 15. As a convenient means for imparting initial rotation to the rotor of the motor for starting the same, the shaft 12 is shown as provided at the front end with a knurled knob 16.

The angular spacing of the pole terminals of any segment of the armature corresponds to the angular spacing of the pole terminals of the pole plates 10 and also to the angular spacing of the pole terminals of pole plate 11, and hence such angular spacing is twice that of the angular pole spacing of adjacent pole terminals of the complete field. The deep notches 14, in angular extent, equal the angular spacing between adjacent pole terminals of the complete armature so that the angular pole spacing between the adjacent pole terminals of adjacent segments of the armature equal the angular spacing of three pole terminals of the complete armature field.

This brings the north and south pole terminals of the different armature segments into the cooperative relation in respect to the pole terminals of the field, best shown in Fig. 3, by reference to which it will be seen that in respect to attraction and repulsion between the pole terminals of the field and several armature segments, the action is the same in all of the segments, particularly illustrated in Fig. 3, and in respect to which Fig. 3 the operation of the motor will be particularly described.

Operation

The magnetic action that takes place between the pole terminals of the stator and rotor will be made clear by first directing attention to Fig. 4, and assuming that at the particular instance, the pole terminals of the stator are energized north and south, as indicated by the letters N and S, that are not cut out by the segmental line. Here it is obvious that at that particular instant each permanently magnetized pole terminal of the rotor, in its rotation in a clockwise direction in respect to Fig. 4, is subject to the repulsion from an adjacent field pole terminal of the same polarity and to the attraction from the adjacent field pole terminal of opposite polarity. It is also evident that when the rotor is running in step with the alternating current, the pole terminals of the rotor will be one step in advance of the position shown in Fig. 4, when the polarity of the pole terminals of the field or stator are reversed, and are given polarity indicated by the letters N and S, indicated by the said letters crossed out by the curved line of Fig. 4, and that when this change takes place, the same relation as a repulsion and attraction of the rotating armature will continue and will be carried out in all of the groups of permanently polarized pole terminals of the rotor.

In practice, it has been found that a maximum torque with a minimum of current is afforded in this motor. By providing the pole pieces S and N each with a group or multiplicity of pole terminals, several advantages are obtained. In the first place, a large amount of metal capable of a high degree of magnetization is afforded and, in the second place, the magnetic action is in each pole piece distributed at a plurality or large number of different points.

In practice, I have found that while the motor is reversible, that the rotor runs smoother and probably with a somewhat higher efficiency, when turning in the clockwise direction in respect to Fig. 4; and this is due to the manner in which the notches between the pole terminals are obliquely cut so that the pole terminals are presented to the pole terminals of the stator under a progressive approaching action. The advantages of this motor, insofar as they have been tested to date, have been found to be as follows:

1. Greater torque with the given amount of current;
2. A maximum of torque under slow motion;
3. Greater permanence in the permanent magnet of the armature or rotor, due to the relatively large amount of metal in each pole segment adjacent to the groups of pole terminals;
4. Less de-magnetizing effect when the motor is stopped with current on;
5. Elimination of laminated armature and elimination of hum due to laminated armatures and to vibration; and
6. Very simple construction with no parts likely to get out of order and easy assemblage and disassemblage for inspection and repairs, if necessary.

Here it should be noted that the armature or rotor works in the open face of the stator so that when pinion 15 is removed from shaft 12, said shaft with the rotor can be axially removed and axially replaced.

Figure 5:
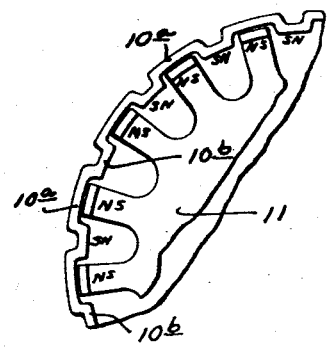
Fig. 5 is a fragmentary view illustrating a modified form of one of the field or stator-forming members.

Fig. 5 simply illustrates the fact that it is possible to provide or form one of the magnetic members of the stator with the pole terminals without notching the same. With this modification, the cup-shaped pole plate $10^a$, instead of being notched, is provided with pole terminals $10^b$, formed by inwardly pressed portions $10^b$.

From the foregoing it is evident that the motor illustrated is capable of various modifications as to construction and arrangement of parts all within the scope of the invention herein disclosed and broadly claimed. Moreover, it is obvious that while the motor is especially intended to be made in small sizes, that it may be made in any size found desirable. A motor which has been made and tested and found highly efficient with half the dimensions of the drawings is presented in this application. This motor as designed, under the action of a sixty cycle single phase alternating current, ran at the rate of 200 revolutions per minute, but in other experiments, I have found that by varying the number of pole terminals, in the stator and rotor, the speed of the motor can be both increased and decreased.

For convenience, in the claims, the term "electric motor" is employed, but it will, of course, be understood that it will be within the scope of the invention to mechanically drive the rotor and thereby convert the motor into a generator.

What I claim is:

1. In a sub-synchronous electric motor, the combination with a stator-structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material shaped to form a plurality of pairs of permanently-magnetized polar-projections; the respective polar-projections of each of said pairs thereof being of permanent opposite polarity and spaced from each other in such manner that when one polar-projection of a given pair is aligned with a stator polar-projection of one polarity, the complementary polar-projection of the said pair is aligned with a stator polar-projection of opposite polarity; the complementary polar-projections of a given pair thereof having a gap between them of less distance than the distance separating one pair from another pair.

2. In a sub-synchronous electric motor, the combination with a stator-structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material shaped to form a plurality of pairs of permanently-magnetized polar-projections; the respective polar-projections of each of said pairs thereof being of permanent opposite polarity and spaced from each other in such manner that when one polar-projection of a given pair is aligned with a stator polar-projection of one polarity, the complementary polar-projection of the said pair is aligned with a stator polar-projection of opposite polarity; the complementary polar-projections of a given pair thereof having a gap between them of less distance than the distance separating one pair from another pair and having the polar-projections of the rotor arranged so that the south polarity polar-projection of one pair thereof lies substantially diametrically opposite the south polarity polar-projection of another pair.

3. In a sub-synchronous electric motor, the combination with a stator-structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material shaped to form a plurality of pairs of permanently-magnetized polar-projections; the respective polar-projections of each of said pairs thereof being of permanent opposite polarity and spaced from each other in such manner that the respective north polarity polar-projections of the said pairs are simultaneously aligned with stator polar-projections of south polarity when the respective south polarity polar-projections of the said pairs are simultaneously aligned with stator polar-projections of north polarity and having the complementary polar-projections of a given pair thereof spaced apart a distance less than the distance separating one pair from another pair.

4. An electric motor comprising a stator having alternately interposed pole terminals of opposite but changing polarity, a rotor comprising a permanently magnetized disc having deep radial notches dividing the same into segmental major pole pieces, said radial notches being approximately equal in circumferential angle to the angular spacing of the interposed pole terminals of said stator, and a group of pole terminals of constant polarity on each of said segmental major pole pieces, the pole terminals in any one segment being of the same polarity and the pole terminals of some of the segmental groups having a polarity that differs from the polarity of the pole terminals of certain other segmental groups.

5. An electric motor comprising an alternating current electro-magnet having a core, pole plates connected to the opposite ends of said magnet core, one of said pole plates being in cup-shaped form and enclosing said magnet and having circumferentially spaced pole terminals projected at one side of said magnet, the other of said pole plates having laterally projecting pole terminals alternately interposed between the pole terminals of the first noted pole plate, and an armature in the form of a permanent magnet arranged to rotate within the field of said circumferentially spaced pole terminals and having segmentally disposed groups of pole terminals of constant polarity, the polarity of the poles in any one segmental group being of the same polarity but the pole terminals of some of the groups having polarity that differs from the polarity of the pole terminals of certain other groups, said armature being provided, between its groups of segmental pole terminals, with radial notches dividing the same into segmental major pole pieces at the outer edges of which the pole terminals of said rotor are formed, the said radial notches in circumferential angle being approximately equivalent to the angular spacing of the interposed pole terminals of said stator.

6. In a sub-synchronous electric motor, the combination with a stator structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material consisting of four segments shaped to form a plurality of pairs of permanently magnetized polar-projections; the respective polar-projections of each of said pairs thereof being of permanent opposite polarity and spaced from each other in such manner that when one polar-projection of a given pair is aligned with a stator polar-projection of one polarity, the complementary polar-projection of the said pair is aligned with a stator polar-projection of opposite polarity; the complementary polar-projections of a given pair thereof having a gap between them of less distance than the distance separating one pair from another pair.

7. In a sub-synchronous electric motor, the combination with a stator-structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material consisting of four segments having pole terminals comprising pairs of terminals of permanent opposite polarity spaced apart in such a manner that when one pole terminal of a given pair is aligned with a stator polar-projection of one polarity, the other pole terminal of the said pair is aligned with a stator polar-projection of opposite polarity; the pole terminals of a given pair thereof having a gap between them of less distance than the distance separating one pair of pole terminals from another, said pole terminals of said rotor being arranged so that the south polarity pole terminal of one pair thereof lies substantially diametrically opposite the south pole terminal of another pair.

EINAR G. C. LOFGREN.